(12) United States Patent
Al-Sabah

(10) Patent No.: US 9,505,484 B1
(45) Date of Patent: Nov. 29, 2016

(54) MODULAR AIRCRAFT SYSTEM

(71) Applicant: Nasser M. Al-Sabah, Safat (KW)

(72) Inventor: Nasser M. Al-Sabah, Safat (KW)

(*) Notice: Subject to any disclaimer, the term of this patent is extended or adjusted under 35 U.S.C. 154(b) by 0 days.

(21) Appl. No.: 15/096,216

(22) Filed: Apr. 11, 2016

(51) Int. Cl.

| | | |
|---|---|---|
| *B64C 3/38* | (2006.01) | |
| *B64C 13/00* | (2006.01) | |
| *B64C 9/00* | (2006.01) | |
| *B64C 13/20* | (2006.01) | |
| *B64C 9/32* | (2006.01) | |
| *B64D 27/02* | (2006.01) | |
| *B64C 3/34* | (2006.01) | |
| *B64D 47/08* | (2006.01) | |
| *B64D 15/00* | (2006.01) | |
| *B64C 39/02* | (2006.01) | |
| *B64D 37/00* | (2006.01) | |
| *B64D 27/14* | (2006.01) | |
| *B64D 27/20* | (2006.01) | |

(52) U.S. Cl.
CPC . *B64C 3/38* (2013.01); *B64C 3/34* (2013.01); *B64C 9/00* (2013.01); *B64C 9/326* (2013.01); *B64C 13/00* (2013.01); *B64C 13/20* (2013.01); *B64C 39/024* (2013.01); *B64D 15/00* (2013.01); *B64D 27/02* (2013.01); *B64D 27/14* (2013.01); *B64D 27/20* (2013.01); *B64D 37/00* (2013.01); *B64D 47/08* (2013.01); *B64C 2201/021* (2013.01); *B64C 2201/048* (2013.01); *B64C 2201/063* (2013.01); *B64C 2201/141* (2013.01); *B64C 2201/146* (2013.01); *B64C 2201/16* (2013.01); *B64C 2211/00* (2013.01)

(58) Field of Classification Search
CPC ............ B64C 3/38; B64C 3/34; B64D 27/02
See application file for complete search history.

(56) References Cited

U.S. PATENT DOCUMENTS

| | | | |
|---|---|---|---|
| 3,966,142 A * | 6/1976 | Corbett | ............... B64C 29/0075 244/12.4 |
| 4,538,779 A * | 9/1985 | Goldstein | ................. B64C 5/10 244/225 |
| 4,736,910 A | 4/1988 | O'Quinn et al. | |
| 5,779,190 A | 7/1998 | Rambo et al. | |
| 6,056,237 A | 5/2000 | Woodland | |
| 6,065,720 A | 5/2000 | Ash et al. | |
| 7,234,667 B1 | 6/2007 | Talmage, Jr. | |
| 7,237,750 B2 | 7/2007 | Chiu et al. | |
| 7,699,261 B2 | 4/2010 | Colten et al. | |
| 7,798,449 B2 * | 9/2010 | Small | .................... B64C 39/024 244/1 TD |

(Continued)

FOREIGN PATENT DOCUMENTS

EP          2725442          4/2014

*Primary Examiner* — Justin Benedik
(74) *Attorney, Agent, or Firm* — Richard C. Litman

(57) ABSTRACT

The modular aircraft system includes a single fuselage having a permanently installed empennage and plural sets of wing modules and engine modules, with each wing and engine module optimized for different flight conditions and missions. The fuselage and each of the modules are configured for rapid removal and installation of the modules to minimize downtime for the aircraft. Short wings having relatively low aspect ratio are provided for relatively high speed flight when great endurance and/or weight carrying capacity are not of great concern. Long wings having high aspect ratio are provided for longer range and endurance flights where speed is not absolutely vital. A medium span wing module is also provided. Turboprop, single turbojet, and dual turbojet engine modules are provided for installation depending upon mission requirements for any given flight. The aircraft is primarily adapted for use as an autonomously operated or remotely operated unmanned aerial vehicle.

13 Claims, 18 Drawing Sheets

(56) References Cited

U.S. PATENT DOCUMENTS

| | | |
|---|---|---|
| D665,331 S | 8/2012 | Sands |
| 8,256,714 B2 | 9/2012 | Zhao |
| 8,660,712 B2 | 2/2014 | Grabowsky et al. |
| 2014/0061390 A1* | 3/2014 | Woodworth ........... B64D 27/26 244/23 D |
| 2014/0231593 A1* | 8/2014 | Karem .................. B64C 1/0009 244/45 R |
| 2014/0360206 A1* | 12/2014 | Bradbrook ................ F02C 7/32 60/797 |
| 2015/0014482 A1* | 1/2015 | Weierman ............... H02S 10/40 244/124 |
| 2015/0048215 A1 | 2/2015 | McGinnis |

* cited by examiner

MODULAR AIRCRAFT SYSTEM

BACKGROUND OF THE INVENTION

1. Field of the Invention

The present invention relates generally to the field of aviation, and particularly to a modular aircraft having interchangeable wing and powerplant modules. The aircraft is particularly adapted as a remotely or autonomously controlled unmanned aerial vehicle (UAV).

2. Description of the Related Art

Virtually all aircraft are designed and engineered to optimize their configurations for specific mission requirements. For example, a long range reconnaissance aircraft requires significantly more fuel than would a short range fighter or interceptor aircraft, while speed may not be critical for a reconnaissance aircraft operating at extreme altitudes. This necessitates different wing configurations and may necessitate different engine configurations as well, depending upon the speed, altitude, and duration desired for each mission.

Accordingly, aircraft intended for fighter interceptor missions are generally configured with relatively short wings to minimize frontal aerodynamic drag for maximum speed, while also being equipped with a relatively powerful engine(s). Such aircraft might also be used for reconnaissance, but only for shorter range missions due to the fuel consumption and relatively small onboard fuel capacity provided by the interior volume of the relatively small wings. On the other hand, a long range reconnaissance aircraft is generally provided with wings of relatively large span and high aspect ratio to minimize induced drag and to maximize range. This is also true of other aircraft intended for long range missions or operations.

As a result, aircraft manufacturers have developed a wide array of aircraft having major differences in their configurations in order to optimize those configurations for their intended missions or operations. Examples of such may be seen in the products of a single manufacturer, e.g., Lockheed-Martin. The Lockheed Aircraft Company (before merger with Martin) manufactured the U-2, a long range, high altitude reconnaissance aircraft with extremely high aspect ratio wings and powered by a single turbojet engine. More recently, Lockheed merged with the Martin Aircraft Company to become Lockheed-Martin, which company (in partnership with other aerospace companies) produces the F-35 fighter, a short wing twin turbojet aircraft of relatively limited range and endurance.

The two aircraft types noted above were designed and manufactured as completely separate and distinct airframes powered by turbojet engines having quite different characteristics. Thus, in order to have aircraft capable of fulfilling both the fighter-interceptor role and the long range reconnaissance role, it was necessary for the military to purchase two completely different aircraft.

Other attempts have been made to provide multirole aircraft, e.g., the General Dynamics F-111 and the Grumman F-14 with their "swing wing" variably adjustable wing sweepback. The wings on these aircraft pivoted rearward to reduce the effective aspect ratio and frontal area for high speed flight, while pivoting forward to reduce the sweep angle and stall speed for takeoff, landing, and subsonic flight. However, the wings remained permanently attached to the aircraft in each aircraft type. They were not readily removable, and no other wing configurations were provided to adapt the aircraft for different missions or operations. Moreover, each aircraft was equipped with only a single engine configuration that was essentially permanently installed, excepting provision for removal for maintenance.

A number of retrofit devices and attachments have been developed for addition to existing aircraft. For example, winglets for attachment to the wingtips of an aircraft have been developed, to reduce the losses or spillage of air around the wingtips. However, these various attachments and retrofit devices are generally not modular in nature, and cannot be readily detached and/or reattached to different aircraft structures. The subject aircraft structures would require redesign in order to have multi-operational capability.

Thus, a modular aircraft solving the aforementioned problems is desired.

SUMMARY OF THE INVENTION

The modular aircraft system essentially includes a single fuselage having a permanently attached empennage, with different wing and engine configurations being quickly and easily interchanged with the fuselage to construct a desired aircraft. While such a modular aircraft can be constructed with on-board flight controls enabling control and operation by an on-board flight crew, the present modular aircraft is primarily adapted for operation and use as an unmanned aerial vehicle (UAV), operating either autonomously or by a remotely situated operator.

The present disclosure encompasses three different wing configurations, i.e., a relatively short span, low aspect ratio wing, a medium span wing, and a long span, high aspect ratio wing. These different wing configurations are optimized for different missions or operations, with the shorter span being optimized for higher speeds and the longer span being optimized for longer mission durations but at lower speeds. Each wing configuration is provided with blended "winglets," i.e., upwardly oriented wingtip surfaces to reduce wingtip vortices and corresponding loss of aerodynamic lift around the wingtips. The three different wing configurations disclosed herein are exemplary, and it will be seen that additional wing configurations may be provided. The wings can be equipped with "hard points," i.e., attachment points, for the carriage of additional permanently installed or releasable external fuel tanks, weaponry, releasable supply pods for rescue missions, etc. At least some wing configurations can be equipped with deice and/or anti-ice capability, as well as additional aerodynamic devices (e.g., flaps and leading edge slats) to enhance slow speed performance and reduce stall speed.

Three different engine modules are disclosed as well, i.e., turboprop, single turbojet, and dual turbojet modules. These three engine modules are optimized for different missions and operating environments, depending upon the speed, altitude, and endurance required of the aircraft for a given mission. These three different engine modules are exemplary, and additional engine modules having different engine configurations may be provided. The engine modules, as well as the various wing modules, are attached to the fuselage by mechanical, electromechanical, and/or magnetically locking attachments for ease of removal and replacement. This also allows a damaged wing and/or engine module(s) to be quickly replaced to minimize downtime for the aircraft.

In keeping with different mission requirements, the modular aircraft is equipped with a flight management system (FMS) with sensors recognizing each different wing and engine configuration installed upon the single fuselage. The FMS adjusts aerodynamic and engine control responses accordingly for flight. The single fuselage can also be equipped with radar and/or other sensors operating in various electromagnetic spectra, including stereoscopic cameras operating in the visible light spectrum to provide a remote operator with an on-board three-dimensional field of view for operation of the aircraft. These sensors provide through data links, a complete three-dimensional first person view to the aircraft operator and/or base of operations. The data output can be connected to virtual reality helmets or other display means for the aircraft operator. The radar and/or other sensors can be interchangeable to provide for the installation of different radar and/or sensor configurations for different missions or operations. Additional sensors, e.g., airspeed, altitude, bearing or direction of flight, attitude, etc., can be incorporated in the aircraft for operation of the aircraft by a remotely situated operator or for autonomous operation.

The landing gear for the aircraft is preferably retractable, and incorporated in the single fuselage in order to simplify the wing construction for the various wing configurations and to simplify the interconnects between fuselage and wings. The fuselage also preferably contains an internal payload bay for weaponry, additional fuel, surveillance equipment such as cameras and/or other sensors, etc. The top of the fuselage further includes an aerodynamic brake located in front of the rearwardly situated engine module. The aerodynamic brake may be considered as a spoiler, i.e., a device "spoiling" or reducing the aerodynamic lift over the fuselage, as the fuselage is shaped or configured somewhat like a lifting body in order to enhance the aerodynamic performance of the modular aircraft. The spoiler is configured such that it does not induce engine flameout in the case of a turbojet engine, and is automated by the flight management system (FMS).

The FMS, including an autopilot system, is situated in the fuselage. The controls to the wings' control surfaces and propulsion modules are controlled via the autopilot and FMS that adjusts to the configuration of the aircraft. When wings and engine are installed and connected to the fuselage, the system automatically detects the given configuration comprising one of the nine possible combinations and loads the parameters respective to the given configuration, e.g., maximum permissible bank angle and rate of roll, etc. This configuration change process is completely automated by the FMS. The fuselage and its permanently installed empennage, as well as the various wings, are preferably constructed of a combination of carbon fiber and other high strength materials to provide optimum strength to weight ratios, and are optimized to minimize aerodynamic drag.

Various hard points, i.e., attachment points for external stores (fuel, weaponry sensors, etc.) can be provided in and beneath the wings and/or fuselage, as desired. These hard points can vary in number, from as few as one or two beneath each wing of the shorter wing configuration, to as many as four, five, or more beneath each wing of the longer wing configuration.

The modular aircraft system can be equipped as a fuel tanker to supply inflight refueling to other manned or unmanned aircraft. The fuselage can include a retractable refueling line, i.e., hose, rigid boom, etc., deployable from the payload bay and selectively connected to an on-board fuel supply carried within the fuselage and/or wings and/or external tanks on the wings. The flight management system can include software for managing the dispensing of onboard fuel to another aircraft, as well as managing the control of the aircraft for joining up with the fuel receiving aircraft and deploying the fuel dispensing hose or boom.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
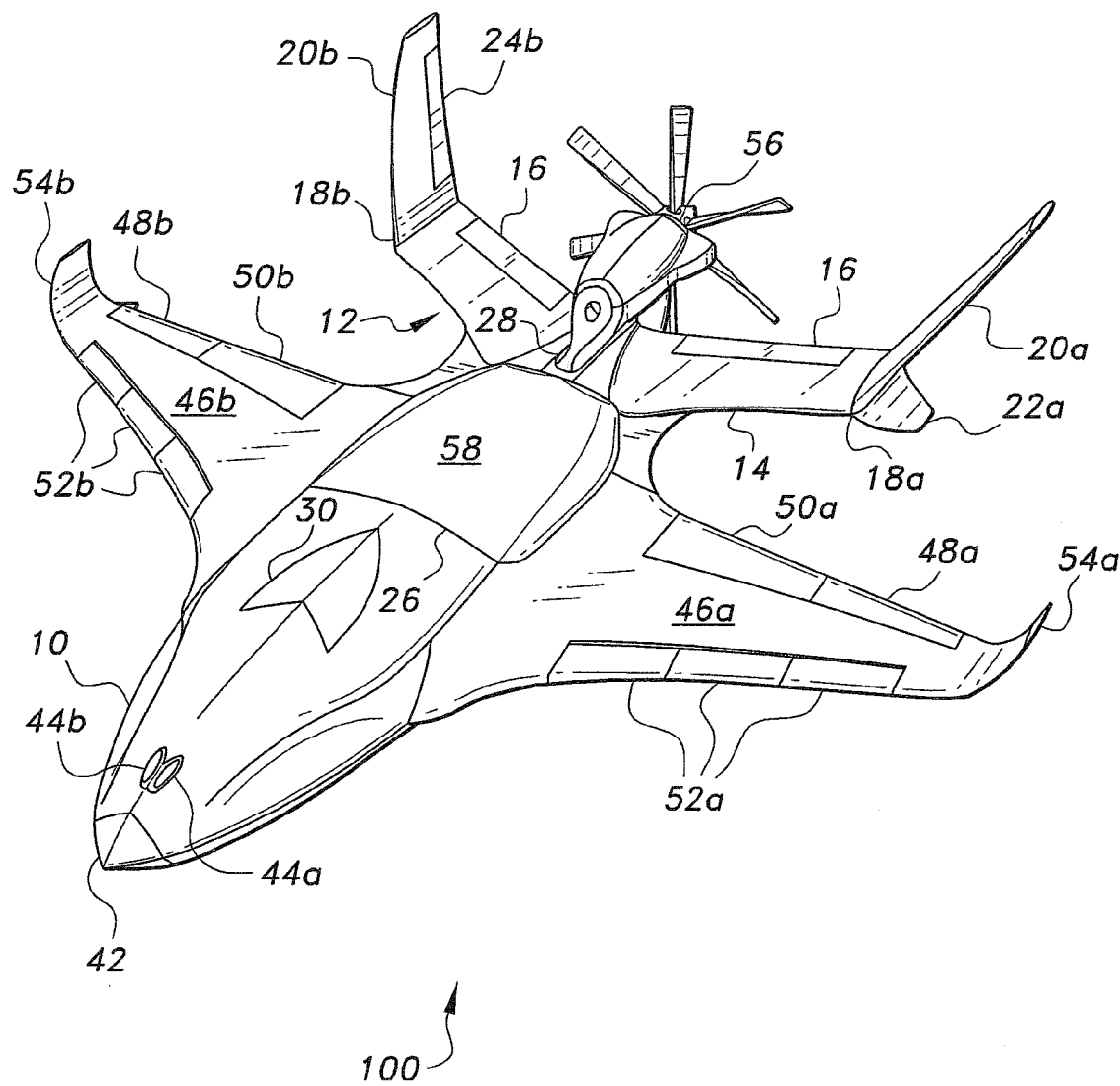
FIG. 1 is a front perspective view of a first embodiment of a modular aircraft system according to the present invention, equipped with short span wings and turboprop engine modules.

The modular aircraft system includes a single fuselage, an empennage, a number of different wing and engine configurations that may be quickly and easily installed to and removed from the fuselage in order to optimize the aircraft for different mission requirements. The modular aircraft system is primarily intended as a remotely piloted or autonomously controlled aircraft, i.e., without a human pilot or operator on board. The modular aircraft can be a drone, for example.

FIGS. 1 through 9 provide perspective views of the nine different aircraft configurations that may be assembled using the three different wing module configurations and three different engine module configurations of the modular aircraft system. In all of the various configurations, the modular aircraft can include a fuselage 10 having a permanently installed empennage 12. The empennage 12 has a fixed stabilizer 14 with movable elevators 16, with the stabilizer 14 having left and right outboard tips 18a, 18b. Fixed upwardly extending fins 20a, 20b and downwardly extending fins 22a, 22b extend from the respective left and right tips 18a, 18b. Each upwardly extending fin 20a, 20b has a movable rudder, respectively 24a and 24b.

The modular aircraft fuselage is configured to withstand wide ranges of temperature and has great strength due to its carbon fiber construction. The aircraft is configured in such a way that the center of gravity of the aircraft always lies along the aircraft fuselage, i.e., along the longitudinal axis, of the aircraft in all aircraft configurations. The fuselage construction comprises panels secured to bulkheads and longerons. The highest loads are distributed along the bulkheads for structural stability, and the panels for the propulsion units are held in place by magnetic locking and detach with a clip mechanism.

The fuselage 10 can include rearwardly disposed first and second engine module stations 26 and 28 (depending upon the engine configuration to be used) and a selectively deployable aerodynamic brake 30 disposed atop the fuselage 10 in front of the engine module stations 26 and 28 (and thus in front of an engine installed to one of the engine module stations). The aerodynamic brake 30 is shown in its open or deployed position in broken lines in FIG. 10. The aerodynamic brake 30 may be considered to act as a spoiler for the fuselage 10, in that the configuration of the fuselage results in the fuselage acting as a lifting body to some extent, i.e., providing some aerodynamic lifting force when flown at a positive angle of attack.

Figure 18:
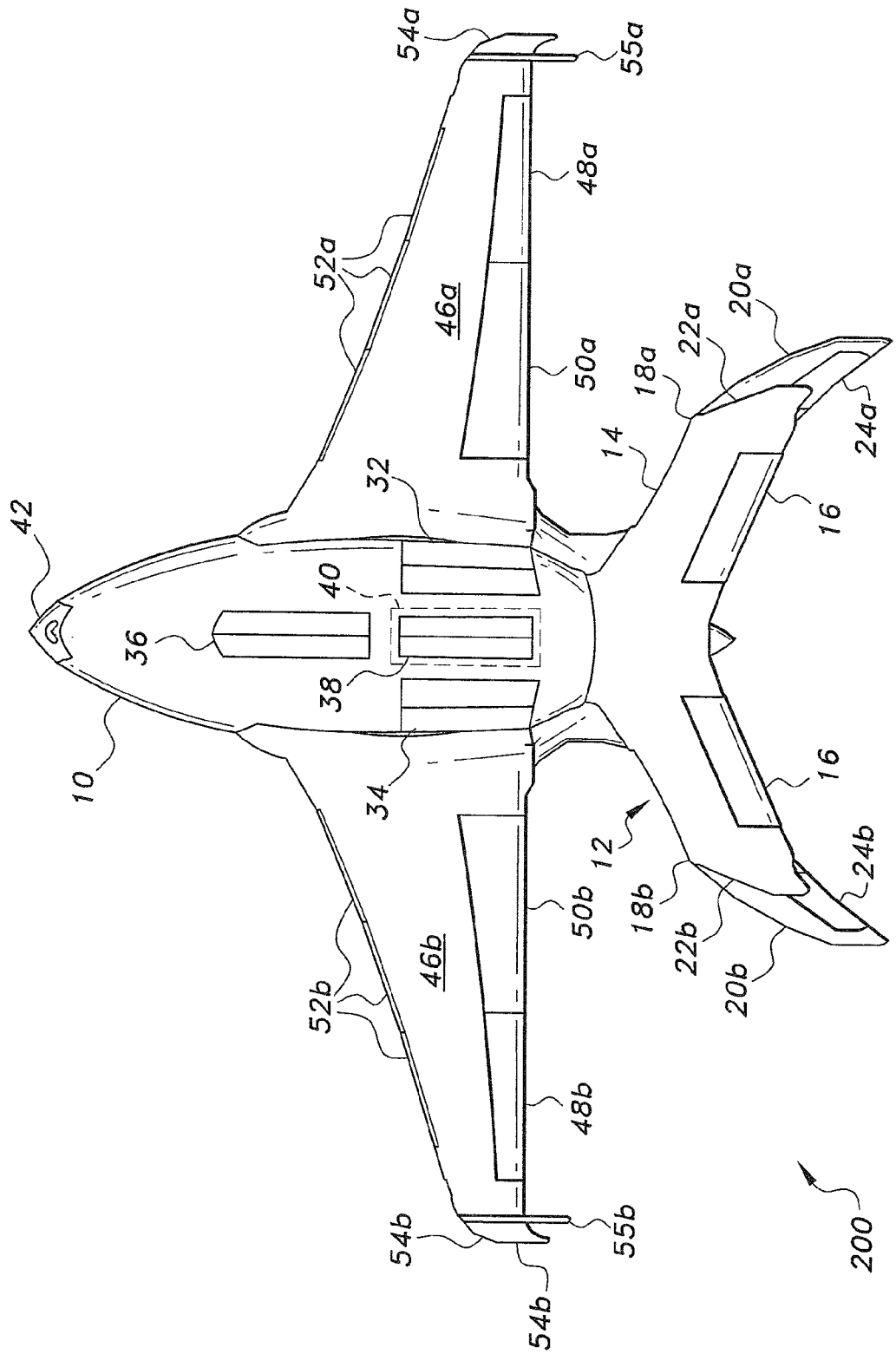
FIG. 18 is a bottom plan view of the second embodiment of the modular aircraft system according to the present invention, illustrating the landing gear and payload bay doors.

The fuselage 10 further includes retractable tricycle landing gear, as evidenced by the left main, right main, and nosewheel landing gear doors, respectively 32, 34, and 36, shown in the bottom plan view of the second embodiment modular aircraft 200 of FIG. 18. FIG. 18 also shows the payload bay doors 38 for the internal payload bay 40, shown in broken lines. A radome 42 on the nose of the fuselage 10 protects a radar system installed therebehind. The radome is connected to the fuselage via a rail link mechanism and can be easily replaced. The radar may be any of various types, e.g., weather, targeting, etc., and the various radar units may be interchangeably installed in the fuselage 10. Sensors 44a and 44b are also provided in the nose of the fuselage 10. The sensors may operate in the visual spectrum, or in the infrared or other spectrum. Dual sensors 44a, 44b, along with sensors in the bottom of the fuselage, operate in the visual spectrum to provide a remote operator or pilot with a stereoscopic, or three dimensional, viewpoint to facilitate control of the aircraft.

The payloads are shielded from detection and aerodynamically shielded from stresses in the bay and deployable by a hydraulic system. The payload bay is controlled by the FMS through the multifunctional avionics connector, which connects different payloads to the FMS. The aircraft can carry retractable gimbals and other sensors.

FIG. 1 provides a perspective view of a first embodiment modular aircraft 100. The fuselage 10 of the modular aircraft 100 is equipped with a short wing module comprising a short left wing 46a and opposite short right wing 46b, the two wings 46a and 46b being essentially in mirror image to one another. Each wing 46a, 46b includes an aileron, respectively 48a and 48b, for roll control, and a flap, respectively 50a and 50b, for additional lift and drag when required. Leading edge slats, respectively 52a and 52b, may also be provided with the wings 46a and 46b of the short wing module. Each wing 46a, 46b is equipped with a blended winglet, respectively 54a and 54b, to reduce aerodynamic losses at the wingtips. The wings 46a, 46b may also be provided with hard points for removable external attachment of weaponry, fuel tanks, etc., as shown schematically in FIGS. 19 and 20 and described further below in the discussion of the systems disclosed in FIGS. 19 and 20.

The short wing modular aircraft 100 of FIG. 1 has a turboprop engine module 56 installed on the second or rearward engine module station 28. A fairing or cover 58 is provided over the first engine module station 26 when the turboprop engine module 56 is installed on any of the modular aircraft configurations.

Figure 2:
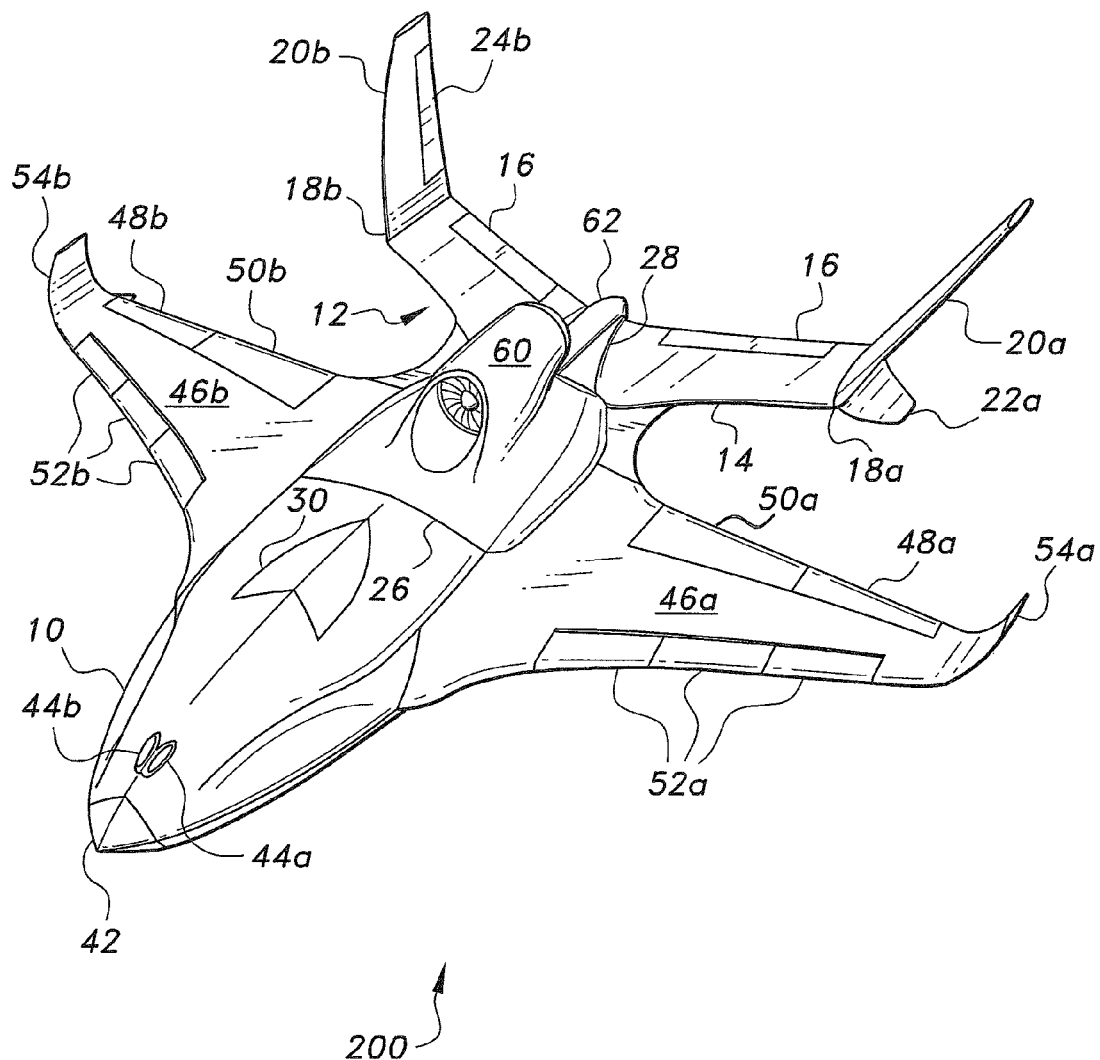
FIG. 2 is a front perspective view of a second embodiment of a modular aircraft system according to the present invention, equipped with short span wings and single turbojet engine modules.

FIG. 2 is a perspective view of a second embodiment modular aircraft 200. The airframe of the modular aircraft 200 is identical to that of the modular aircraft 100 of FIG. 1, differing only in the engine installation. The modular aircraft 200 is equipped with a single turbojet engine module 60, rather than the turboprop engine module 56 of the modular aircraft 100 embodiment of FIG. 1. The single turbojet engine module 60 is installed upon the first or forwardmost engine module station 26, with a cover or fairing 62 installed over the rearward or second engine module station 28 used for the turboprop engine module installation.

Figure 3:
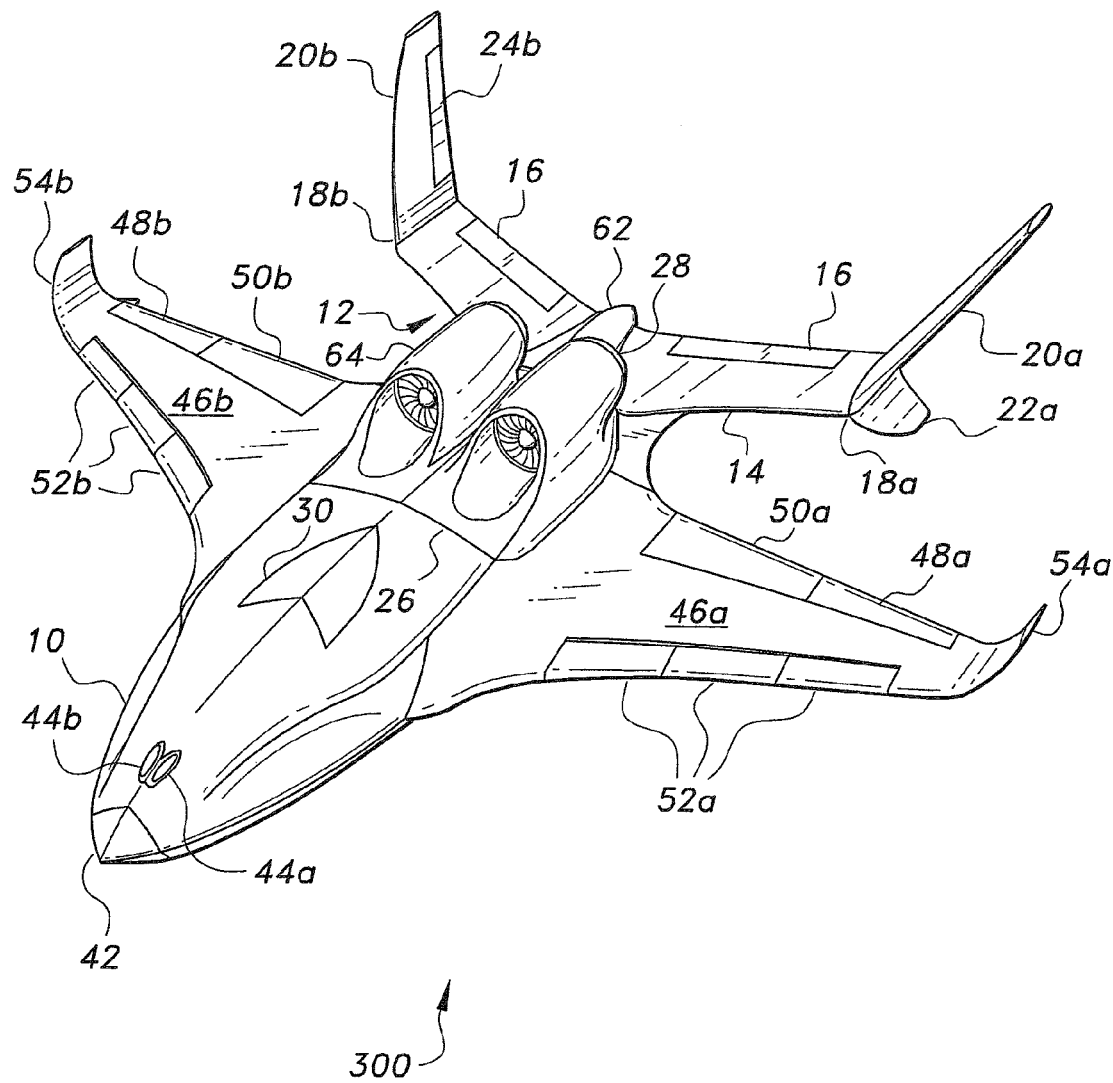
FIG. 3 is a front perspective view of a third embodiment of a modular aircraft system according to the present invention, equipped with short span wings and dual turbojet engine modules.

FIG. 3 is a perspective view of a third embodiment modular aircraft 300. The airframe of the modular aircraft 300 is identical to those of the modular aircraft 100 and 200 respectively of FIGS. 1 and 2, differing only in the engine installation. The modular aircraft 300 is equipped with a dual turbojet engine module 64, rather than the single turbojet engine module 60 of the modular aircraft 200 embodiment of FIG. 2. The dual turbojet engine module 64 is installed upon the first or forwardmost engine module station 26 with a cover or fairing 62 installed over the rearward or second engine module station 28 used for the turboprop engine module installation, generally along the lines of the single turbojet embodiment 200 of FIG. 2.

Figure 4:
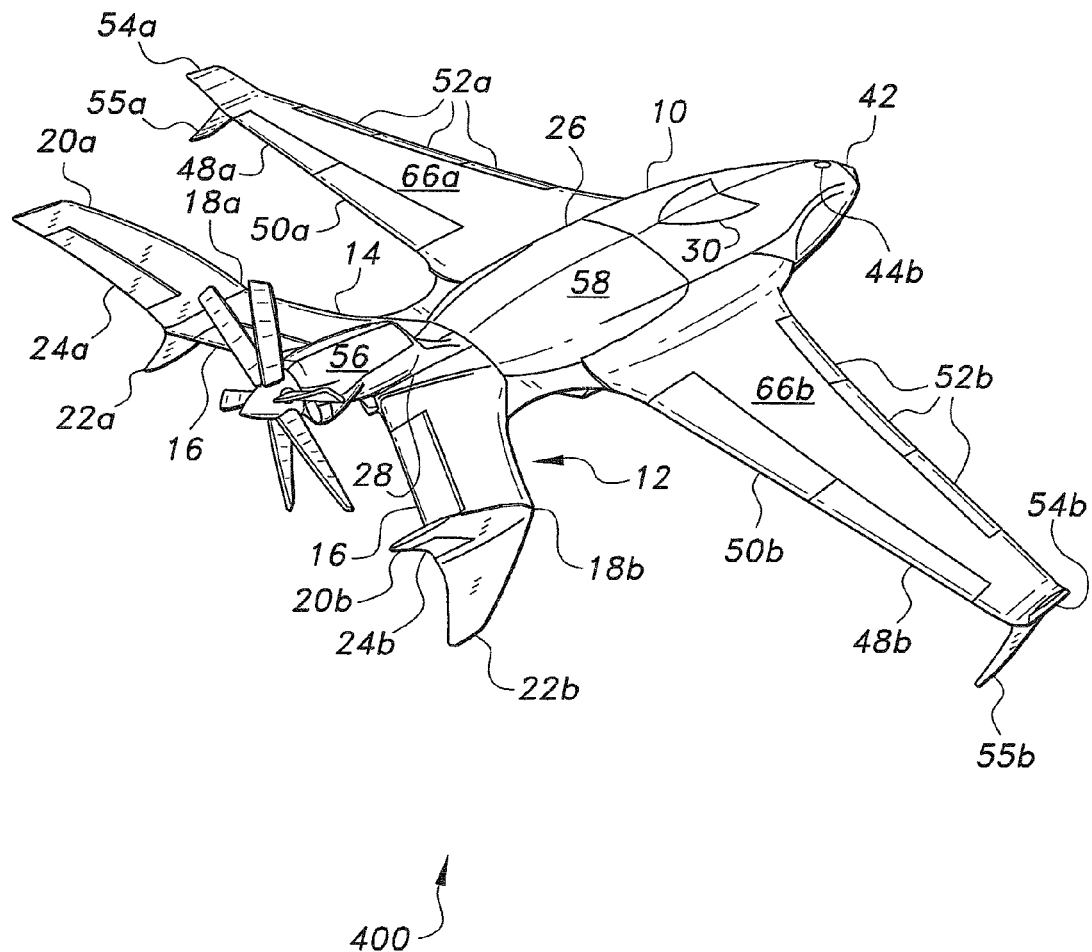
FIG. 4 is a rear perspective view of a fourth embodiment of a modular aircraft system according to the present invention, equipped with medium span wings and turboprop engine modules.

FIG. 4 is a rear perspective view of a fourth embodiment modular aircraft 400. As in all other embodiments, the fuselage 10 and all of its permanently installed components are identical in all embodiments. However, the modular aircraft embodiment 400 of FIG. 4 is equipped with a wing module comprising left and right wings 66a and 66b of intermediate span, or in other words, of a longer span than the span of wings 46a and 46b. The intermediate span wings 66a, 66b include corresponding aerodynamic components to those of the shorter span wings 46a, 46b, i.e., ailerons 48a, 48b, flaps 50a, 50b, slats 52a, 52b, and winglets 54a, 54b, with these aerodynamic components scaled according to the span of the intermediate span wings 66a, 66b. It will be seen in FIG. 4, as well as in subsequent Figs., that depending winglets 55a, 55b may be provided at the wingtips, as well as the blended winglets 54a and 54b. Such depending winglets 55a, 55b may be provided with any of the various wing spans in any of the embodiments, and can serve to increase the efficiency particularly of the shorter span wings 46a, 46b with their correspondingly greater aerodynamic losses at their wingtips. The turboprop engine module 56 of the fourth embodiment 400 of FIG. 4 is identical to that module 56 illustrated in FIG. 1 for the first embodiment modular aircraft 100.

Figure 5:
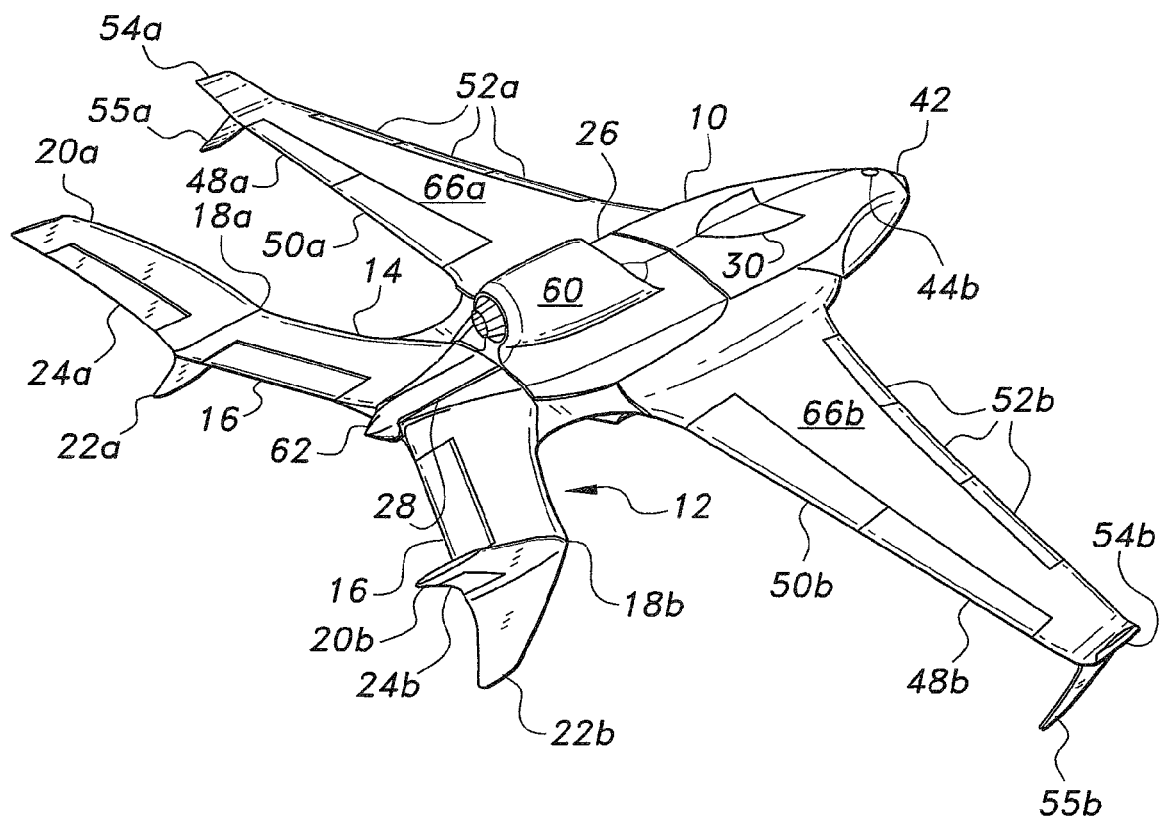
FIG. 5 is a rear perspective view of a fifth embodiment of a modular aircraft system according to the present invention, equipped with medium span wings and single turbojet engine modules.
Figure 6:
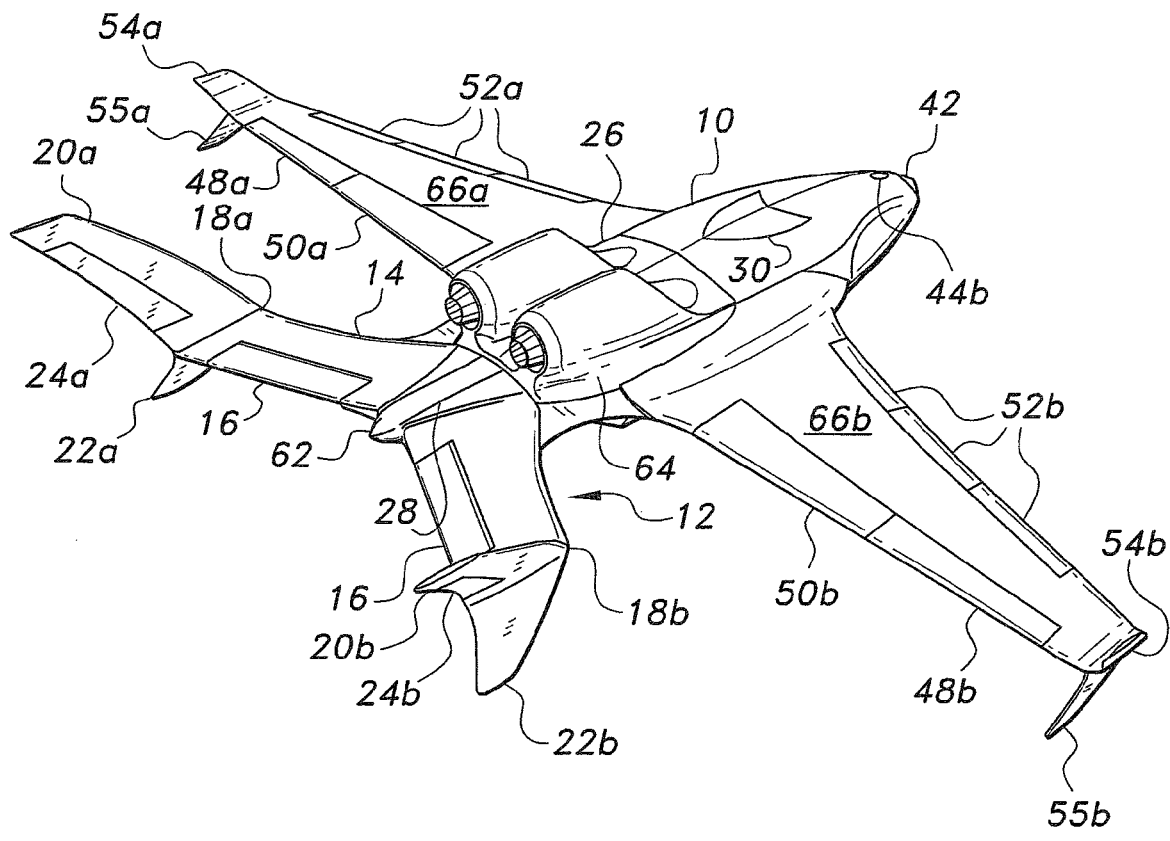
FIG. 6 is a rear perspective view of a sixth embodiment of a modular aircraft system according to the present invention, equipped with medium span wings and dual turbojet engine modules.

The modular aircraft embodiment 500 of FIG. 5 includes intermediate span wings 66a and 66b, as in the modular aircraft embodiment 400 of FIG. 4, and a single turbojet engine module 60 as in the modular aircraft embodiment 200 of FIG. 2. The modular aircraft embodiment 600 of FIG. 6 includes intermediate span wings 66a and 66b as in the modular aircraft embodiment 400 of FIG. 4 and a dual turbojet engine module 64 as in the modular aircraft embodiment 300 of FIG. 3. As in all other embodiments, the fuselage 10 and all of its permanently installed components are identical in all embodiments.

Figure 7:
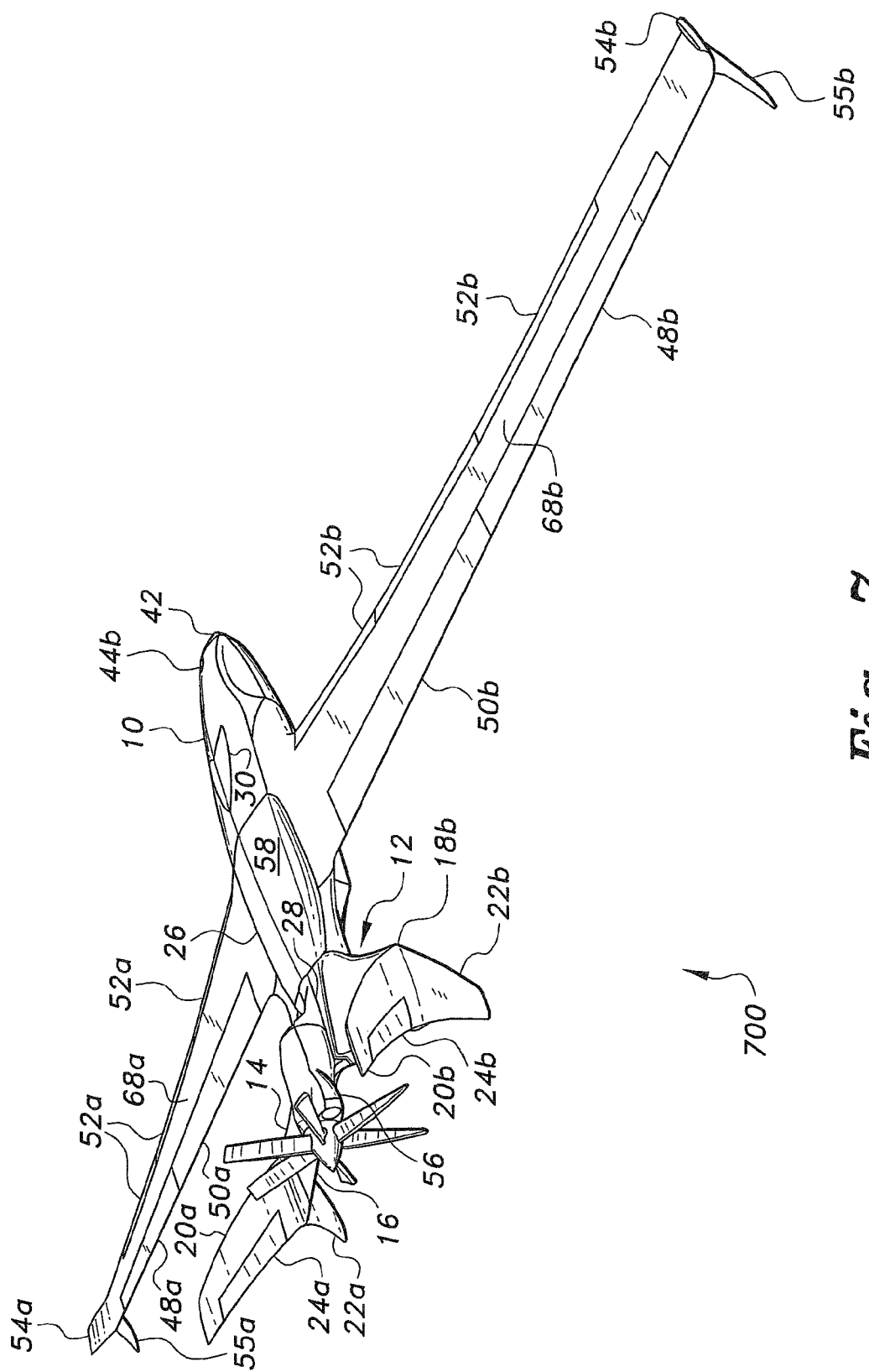
FIG. 7 is a rear perspective view of a seventh embodiment of a modular aircraft system according to the present invention, equipped with long span wings and turboprop engine modules.
Figure 17:
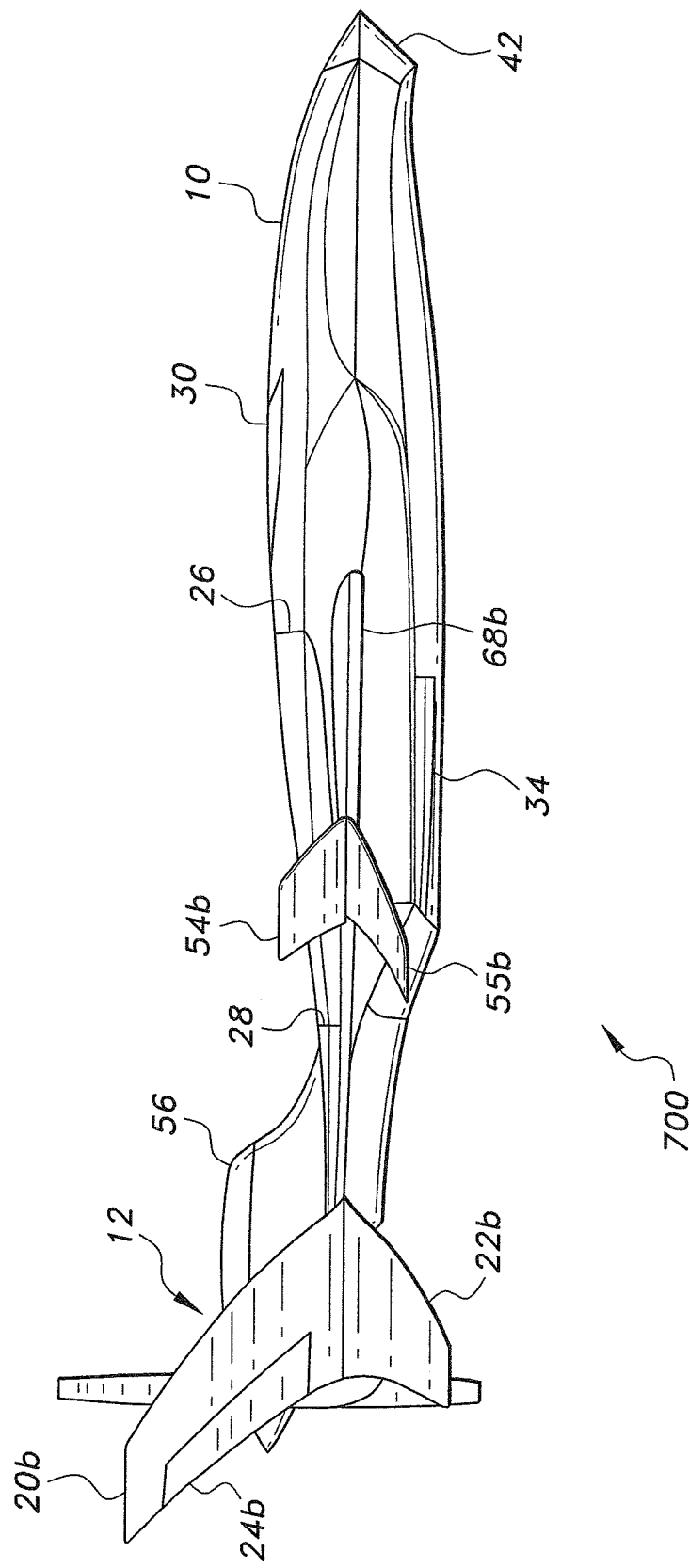
FIG. 17 is a right side elevation view of the seventh embodiment of the modular aircraft system according to the present invention, illustrating its general configuration.

FIG. 7 is a rear perspective view of a seventh embodiment modular aircraft 700, with a right side elevation view of this embodiment being illustrated in FIG. 17. As in all other embodiments, the fuselage 10 and all of its permanently installed components are identical in all embodiments. However, the modular aircraft embodiment 700 of FIG. 7 is equipped with a wing module comprising left and right wings 68a and 68b having a long or wide span, or in other words a span longer than the intermediate span of wings 66a and 66b. The long or wide span wings 68a, 68b include aerodynamic components corresponding to those of the shorter span wings 46a, 46b and intermediate span wings 66a, 66b, i.e., ailerons 48a, 48b, flaps 50a, 50b, slats 52a, 52b, and winglets 54a, 54b, with these aerodynamic components scaled according to the span of the long or wide span wings 68a, 68b. Depending winglets 55a, 55b may be provided at the wingtips, as well as the blended winglets 54a and 54b, as in modular aircraft embodiments 400 through 600 respectively of FIGS. 4 through 6. Such depending winglets 55a, 55b can be provided with any of the various wing spans in any of the embodiments, as noted further above. The turboprop engine module 56 installed to the second engine station 28 of the seventh embodiment 700 of FIG. 7 is identical to that module 56 illustrated in FIG. 1 for the first embodiment modular aircraft 100 and FIG. 4 for the fourth embodiment modular aircraft 400.

Figure 8:
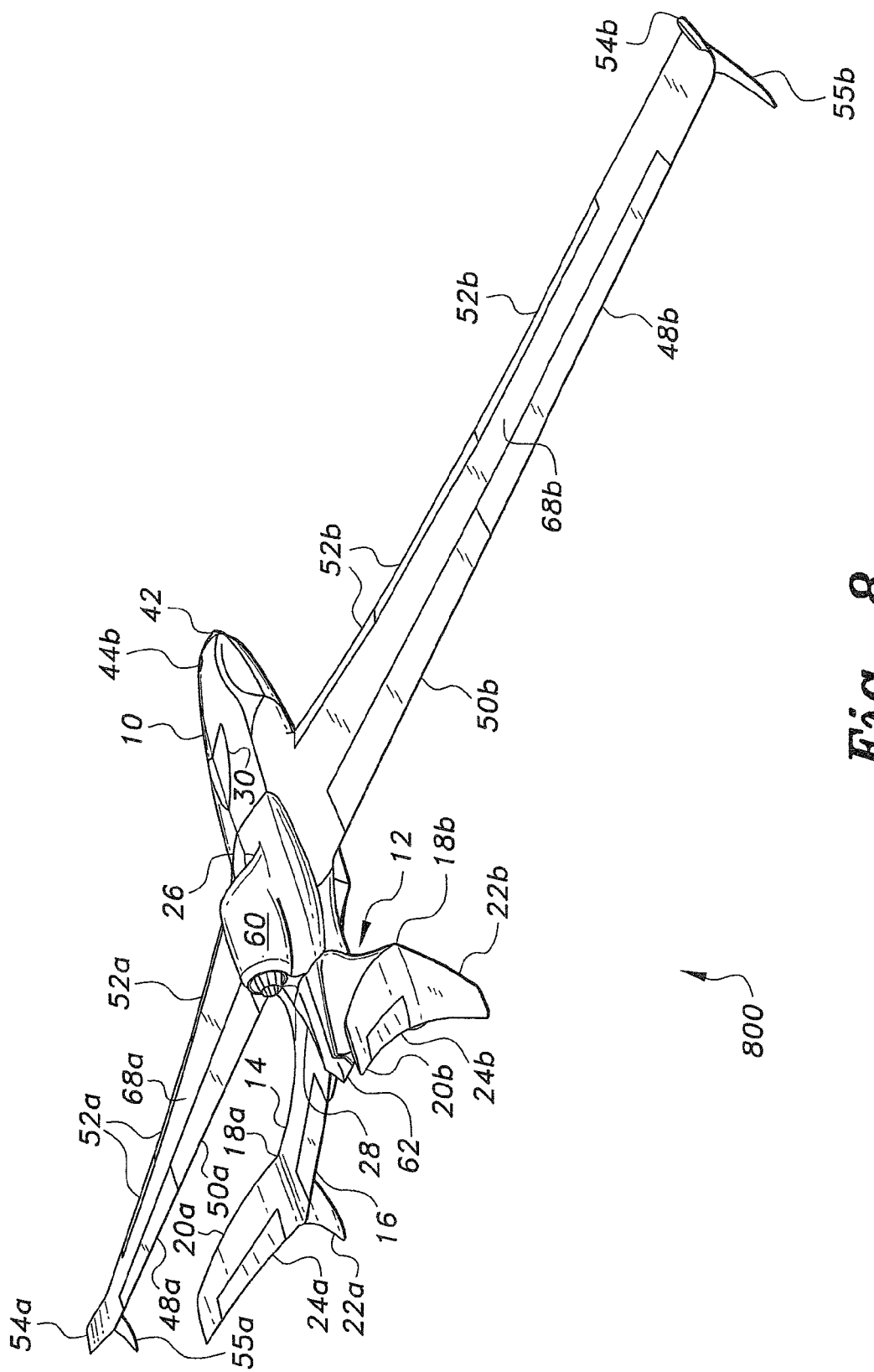
FIG. 8 is a rear perspective view of an eighth embodiment of a modular aircraft system according to the present invention, equipped with long span wings and single turbojet engine modules.
Figure 9:
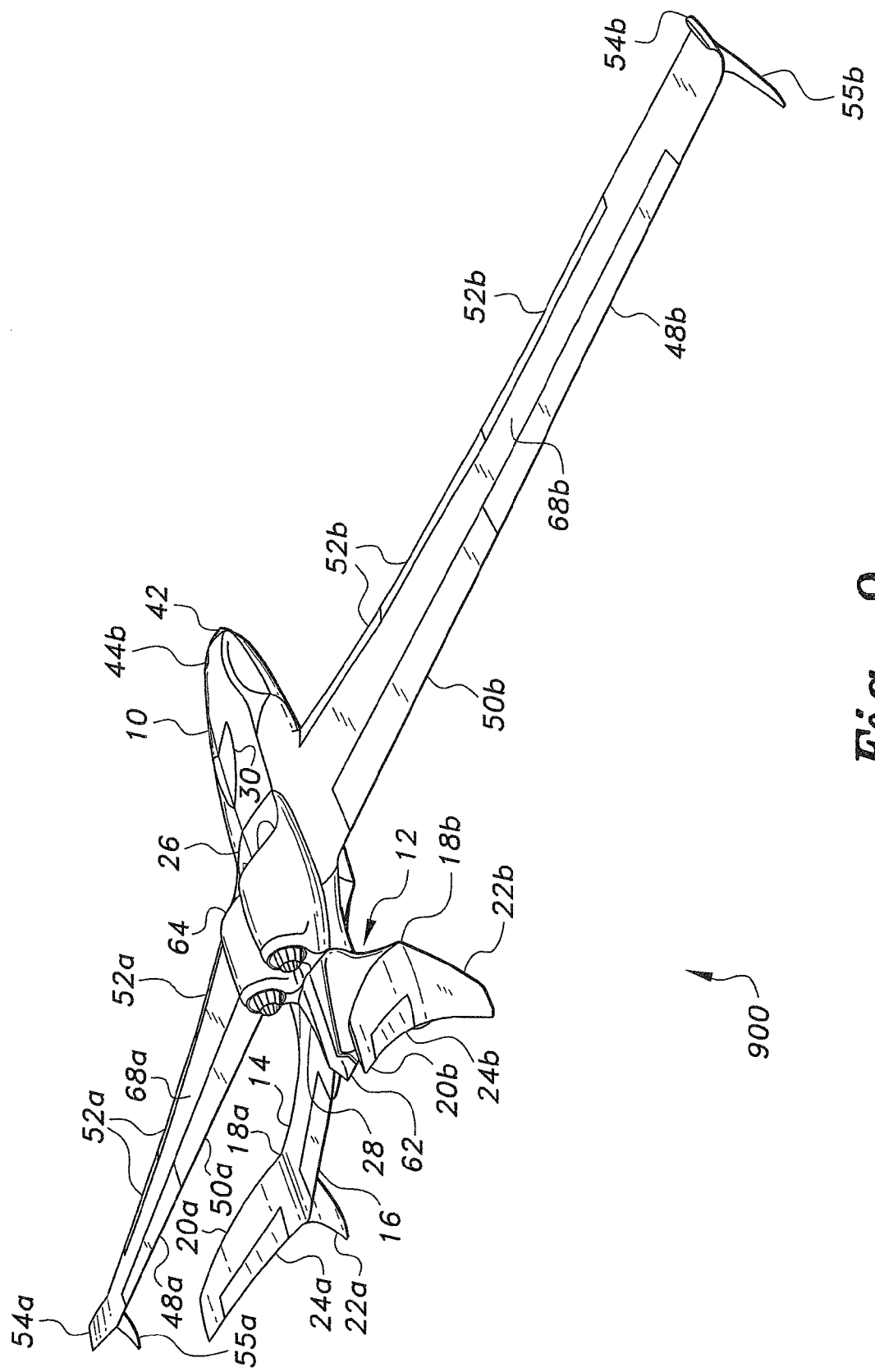
FIG. 9 is a rear perspective view of a ninth embodiment of a modular aircraft system according to the present invention, equipped with long span wings and dual turbojet engine modules.

The modular aircraft embodiment 800 of FIG. 8 includes the long or wide span wings 68a and 68b, as in the modular aircraft embodiment 700 of FIG. 7, and the single turbojet engine module 60, as in the modular aircraft embodiment 200 of FIG. 2 or 500 of FIG. 5. The modular aircraft embodiment 900 of FIG. 9 includes long or wide span wings 68a and 68b of the modular aircraft embodiment 700 of FIG. 7, and the dual turbojet engine module 64, as in the modular aircraft embodiment 300 of FIG. 3 or 600 of FIG. 6.

Figure 10:
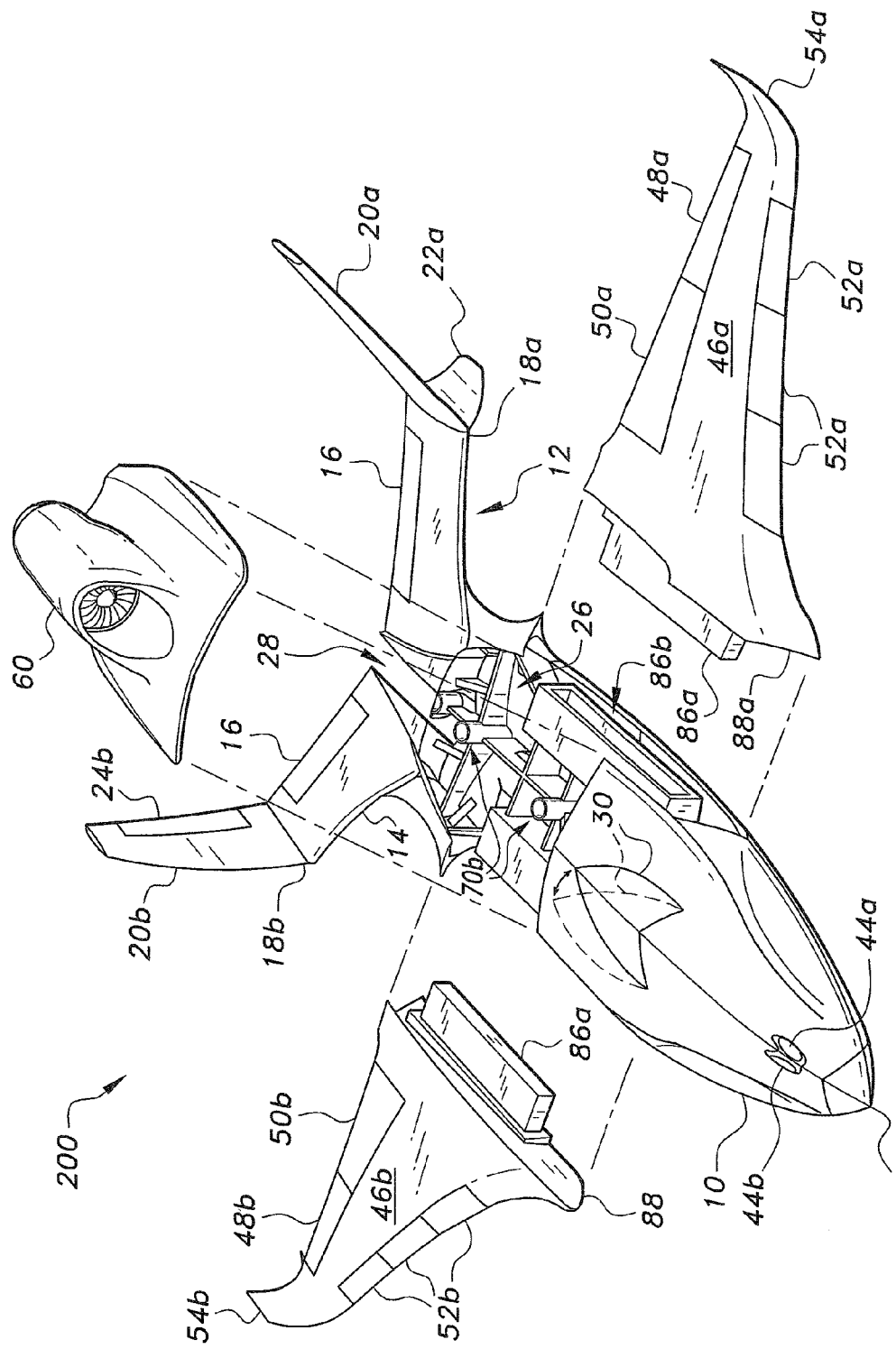
FIG. 10 is an exploded front perspective view of the second embodiment of the modular aircraft system according to the present invention, showing the short span wings and single turbojet modules separated from the fuselage.
Figure 11:
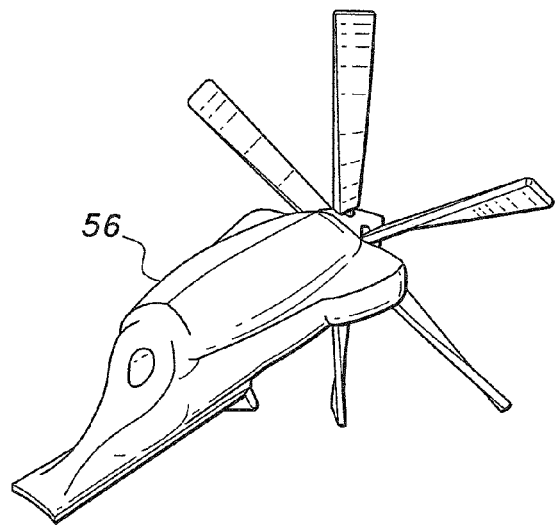
FIG. 11 is a front perspective view of the turboprop engine module of the modular aircraft system according to the present invention.
Figure 12:
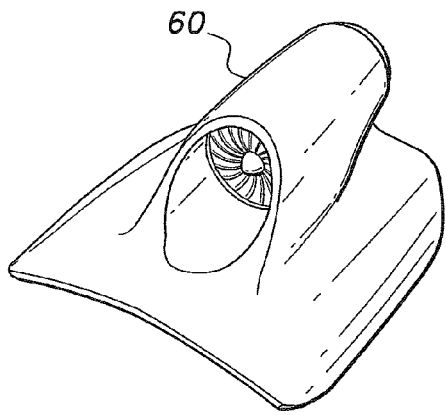
FIG. 12 is a front perspective view of the single turbojet engine module of the modular aircraft system according to the present invention.

FIG. 10 is an exploded perspective view of the second embodiment modular aircraft 200 of FIG. 2, with its shorter span wings 46a, 46b and single turbojet engine 60. The selected single turbojet engine module 60 is exemplary, and any of the engine modules 56, 60, or 64, as shown respectively in FIGS. 11, 12, and 13, may be installed as desired in order to arrive at the respective modular aircraft embodiments 100, 200, or 300 of FIG. 1, 2, or 3, described in detail further above.

Figure 13:
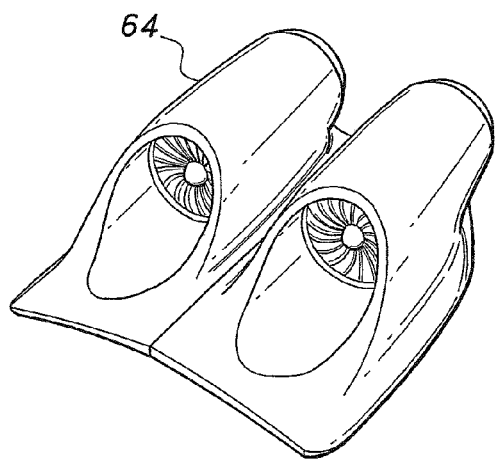
FIG. 13 is a front perspective view of the dual turbojet engine module of the modular aircraft system according to the present invention.
Figure 14A:
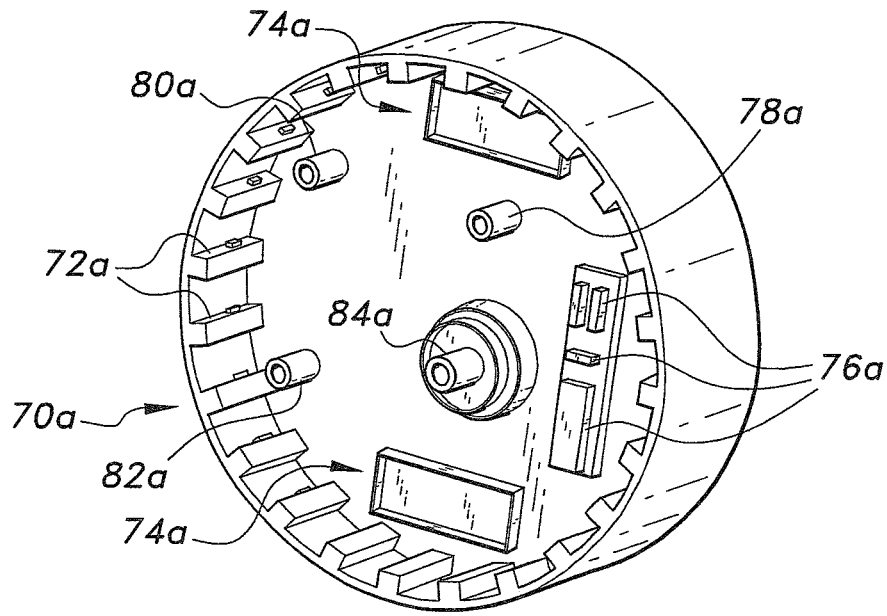
FIG. 14A is a perspective view of a first connector for attaching the engine modules of the modular aircraft system according to the present invention.
Figure 14B:
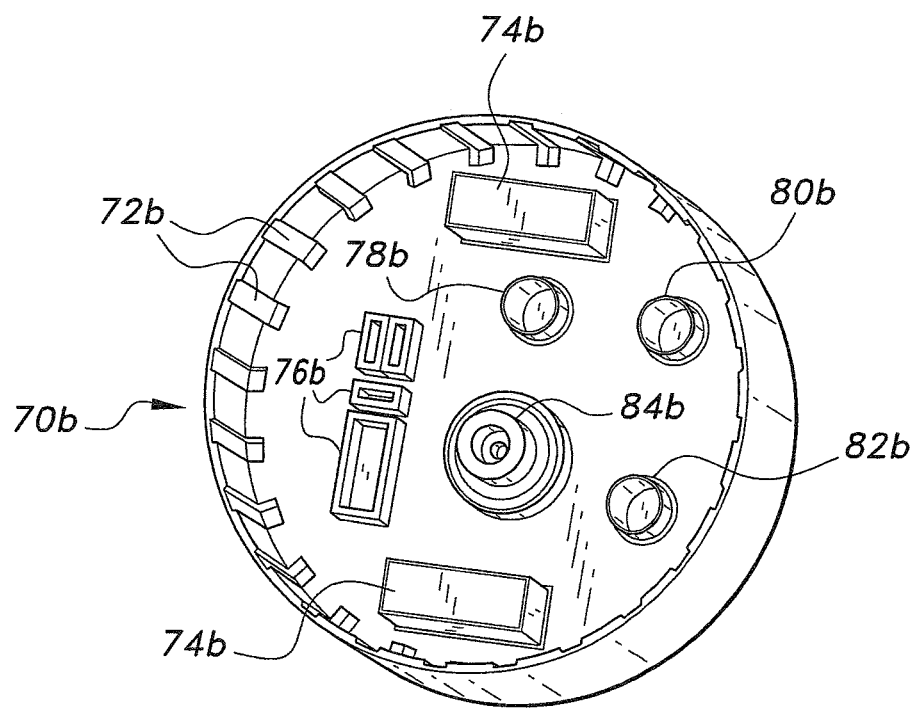
FIG. 14B is a perspective view of a second connector for attaching the engine modules of the modular aircraft system according to the present invention.

FIG. 10 also illustrates further details of the installation of the engine and wing components. The various engine modules 56, 60, and 64 are provided with universal connectors 70a, one of which is shown in FIG. 14a, in order to interface properly with a mating fuselage connector 70b, as shown in FIG. 14b. Two such fuselage connectors 70b are installed in the fuselage 10, to serve as engine attachment bases and to provide operable connection to each of the two turbojet engines of the dual turbojet module 64 (FIG. 13). Only a single connector 70b cooperates with a corresponding single engine connector 70a when either the single turboprop engine module 56 or the single turbojet module 60 is installed. It will be seen that the two connectors 70a and 70b are in mirror image relative to one another, in order that they mate properly with one another when their components are facing one another.

The various connector components are shown somewhat schematically, but comprise mating circumferential mechanical locks 72a, 72b surrounding the other components. Additional mating magnetic locks, respectively 74a and 74b, are also provided within each connector 70a, 70b. Mating flight management system (FMS) sensor connectors 76a, 76b, hydraulic connectors 78a, 78b, electrical connectors 80a, 80b, lubrication connectors 82a, 82b, and fuel connectors 84a, 84b are also provided within the circumferential mechanical locks 72a, 72b of each connector component 70a and 70b. The connectors 70a, 70b may be installed at any convenient or suitable location on the various structures, with an exemplary installation for the fuselage connectors 70b being shown in the engine module station 28 in FIG. 10. This quick connect and quick disconnect system for multiple functions greatly simplifies and accelerates the installation and removal of any of the various engine modules of the system.

Figure 15:
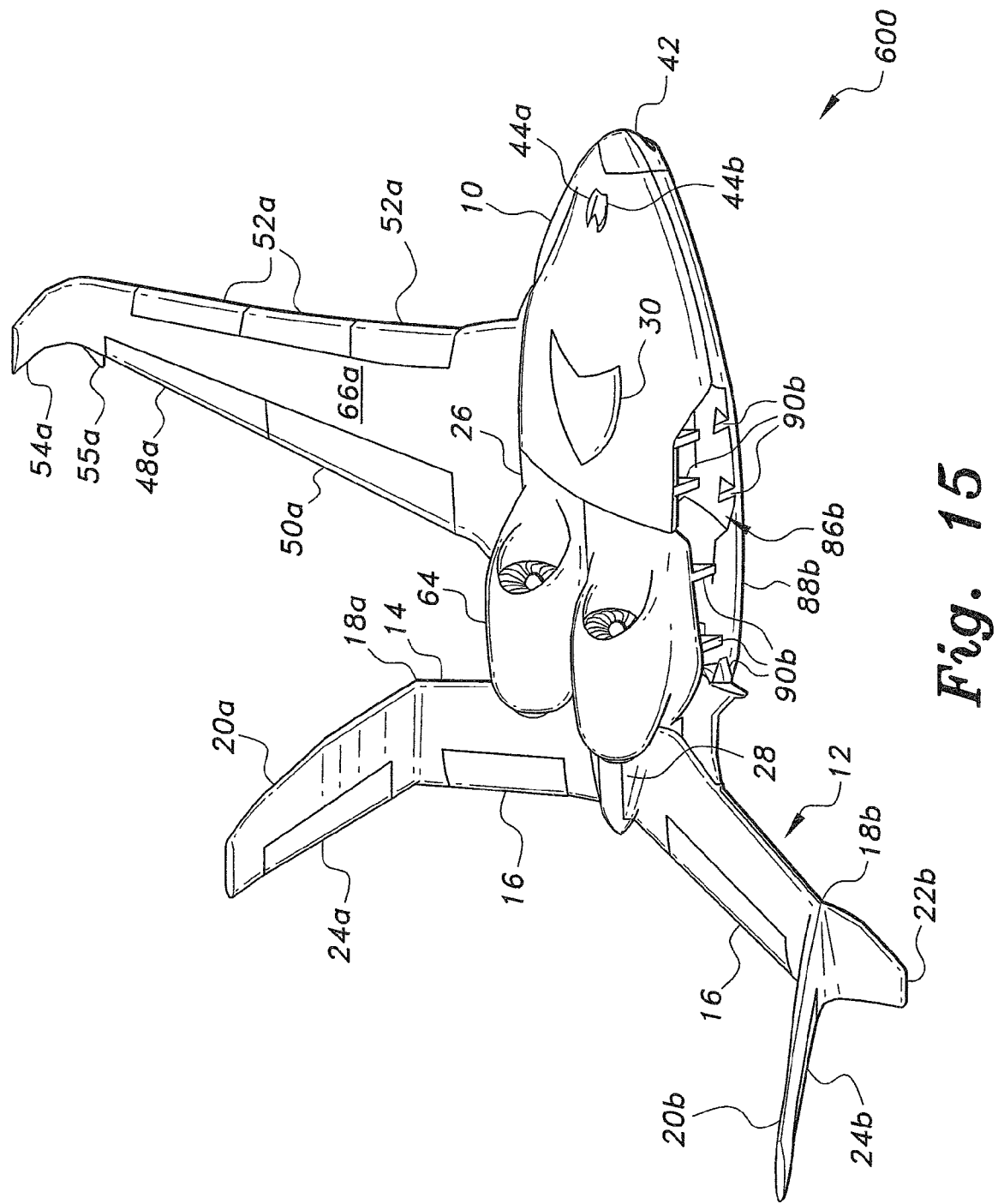
FIG. 15 is a right side perspective view of the sixth embodiment modular aircraft system according to the present invention, showing the right wing removed to illustrate the wing attachment structure.
Figure 16:
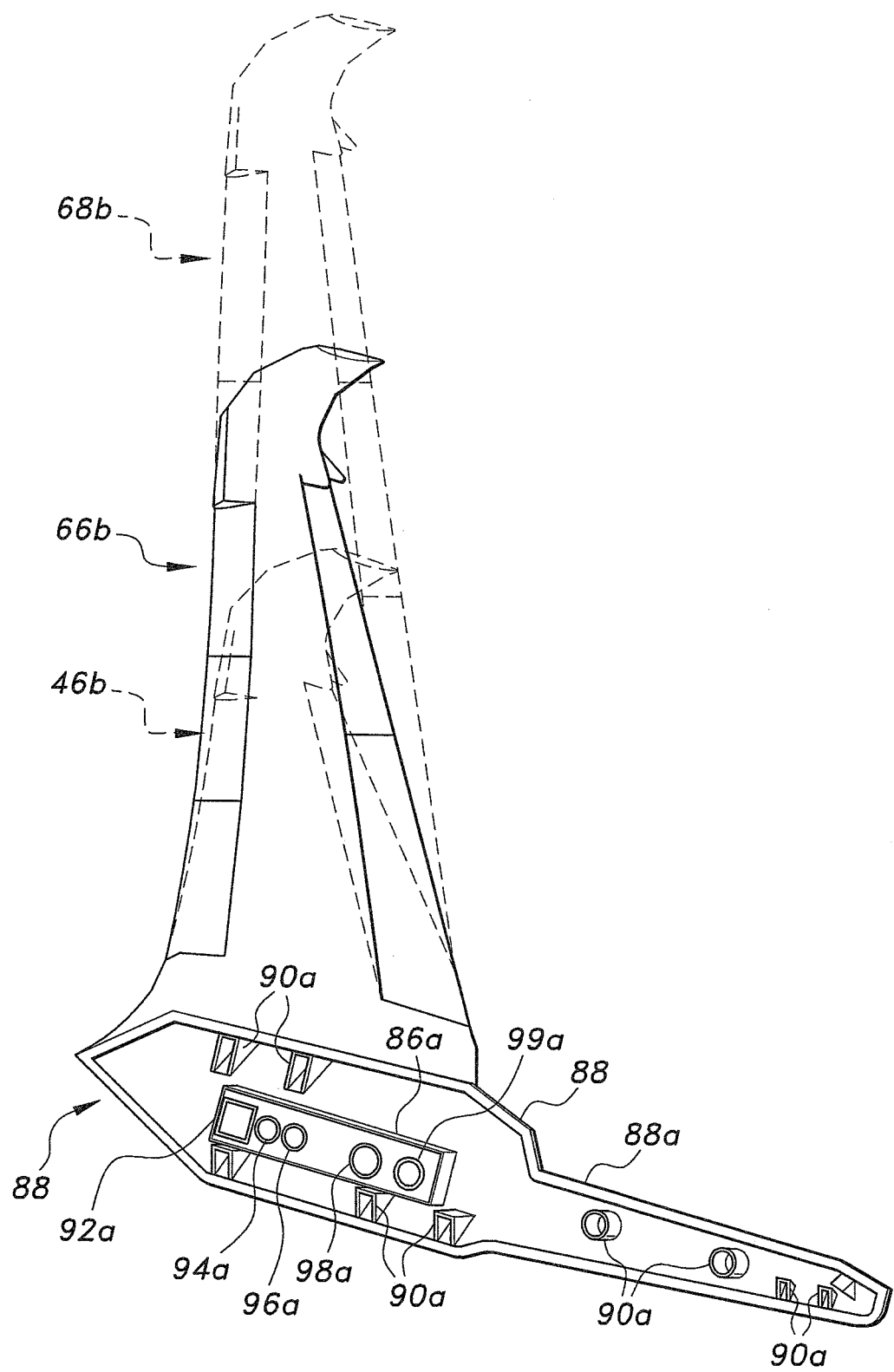
FIG. 16 is a left end perspective view of the medium span right wing of the modular aircraft system according to the present invention showing the wing root attachment structure, with short and long span wings shown in broken lines.

The wing connectors are also illustrated generally in FIG. 10 and in greater detail in FIGS. 15 and 16. All wing modules are connected to the fuselage 10 using the same general principles as used for connecting the various engine modules to the fuselage, as described above. Rather than using a circular or cylindrical connector, as shown in FIGS. 14A and 14B for the engines, rectangular tongues or tabs 86a extend from each wing root 88 to insert into mating receptacles 86b in the fuselage 10, generally as shown in FIG. 10 of the drawings. The magnetic locks and sensors are independent and do not require additional linkage or connectors when changing one wing type to another. The mechanical locks provide added redundancy to the locking mechanism.

FIGS. 15 and 16 provide more detailed views of the wing-to-fuselage connection system. It will be noted in FIG. 16 that only a single wing root 88 is shown, as the wing root configurations for any given side (left or right) are identical for all of the various wing modules of the corresponding side in order to mate with the corresponding left and right wing attachment stations, e.g., the left side station or receptacle 86b shown in FIG. 10, of the single fuselage configuration 10. The left and right wing roots 88 are in mirror image to one another, as are the left and right wing attachment stations. The right wing 66b of the intermediate span wing module is illustrated in solid lines in FIG. 16, with a shorter span right wing 46b and longer span right wing 68b being shown in broken lines in FIG. 16.

The wing root 88 has a peripheral magnetic connector 88a, with the fuselage 10 having a mating magnetic periphery 88b for the wing root attachment. The wing root tab or tongue 86a also includes a series of mechanical connectors 90a that mate with corresponding mechanical connectors 90b at the fuselage receptacle. (The cylindrical fittings toward the trailing edge or right hand portion of the wing root 88 in FIG. 16 are also mechanical connectors or locks 90a of a different geometrical configuration.) A sensor connector 92a for the flight management system (FMS) is provided, as well as a hydraulic connector 94a, an electrical connector 96a, a fuel connector 98a, and a lubrication connector 99a. While corresponding components 92b through 99b are not illustrated in the wing attachment of FIG. 15, it will be seen that mating fittings are provided that are somewhat analogous to the mating fittings 70a through 84b of the engine module attachment components illustrated in FIGS. 14A and 14B. The essentially simultaneous engagement of all of the various fittings to one another when any of the wings are installed to the fuselage 10, serves to greatly facilitate and reduce the time and effort required for such assembly.

The sensors attached to the wing relay the wing type to the flight management software, which automatically adjusts the flight characteristics with respect to the wings. The autopilot receives the signals from the wings and thee engines to determine the configuration. Any mismatch in the configuration will result in an error report from the flight management system, thus alerting maintenance crews to check the connections. When the autopilot receives signals from the wings and engine type, the corresponding configuration is loaded by the FMS. The FMS loads all required aircraft parameters respective to the configuration, such as (but not limited to) maximum rate of roll, maximum bank angle, and stall speeds for any given gross weight, configuration, and G loading. Thus, the changeover of one configuration to another is automated by the FMS.

Figure 19:
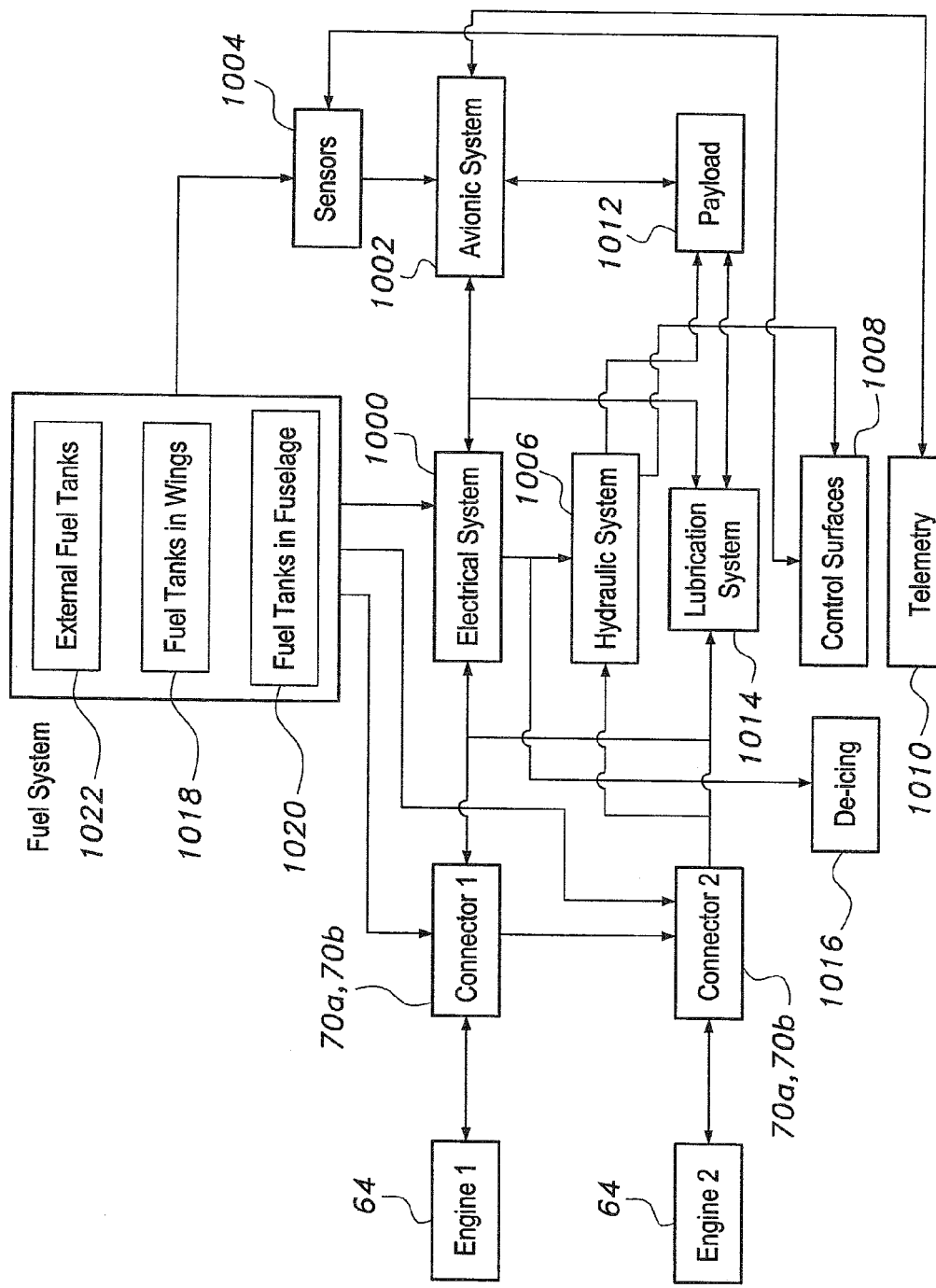
FIG. 19 is a schematic diagram of the general systems of the modular aircraft system according to the present invention.
Figure 20:
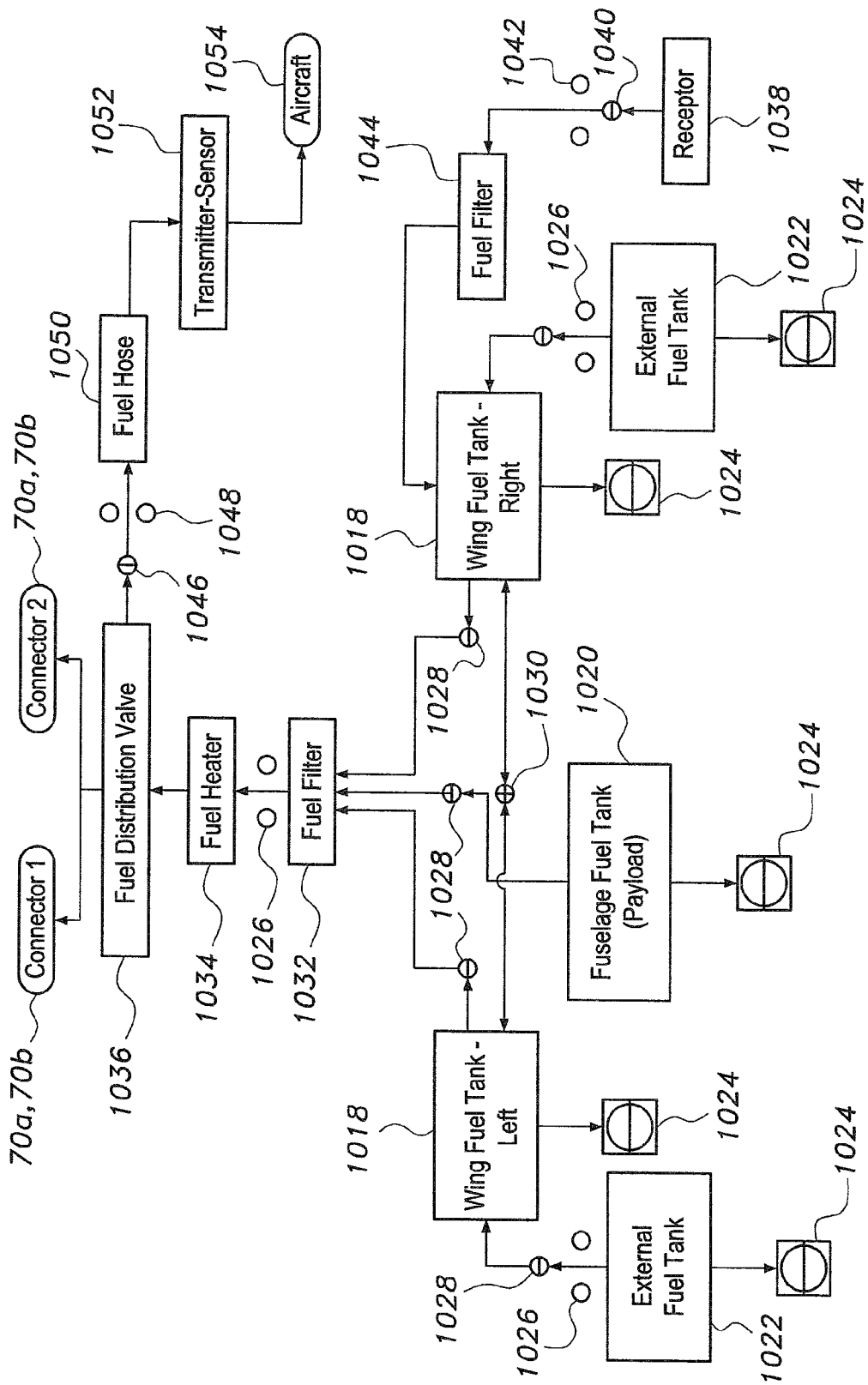
FIG. 20 is a schematic diagram of the fuel system of the modular aircraft system according to the present invention.

FIGS. 19 and 20 are schematic drawings respectively illustrating the basic components and relationships of the sensor and control system and the fuel system. In FIG. 19, the electrical system 1000 serves as the heart of the system and communicates either directly or indirectly with all other systems. The electrical system 1000 receives input from the avionics system 1002, which in turn receives input from the various sensors 1004, e.g., airspeed, altitude, attitude, direction, etc., for operation of the hydraulic system 1006 that operates the various flight control surfaces 1008. The avionics system 1002 also interfaces with telemetry 1010 to provide information to a remotely situated operator and/or to receive input from such a remotely situated operator. The avionics system 1002 may also communicate with the payload 1012, depending upon the requirements of the payload (e.g., so-called "smart" bombs or weaponry, additional sensors, etc.), and further controls the lubrication and de-icing systems, respectively 1014 and 1016. The wings are provided with deicing capability. The sensors on the wing can automatically detect ice formation on the wing and activate deicing on the wing. The wing deicing bladders are heated by electrical power from the aircraft power system to break up any ice formation in flight.

The electrical system further communicates with whichever engine module has been installed. In the exemplary schematic of FIG. 19, two engines are shown, i.e., the dual turbojet engine module 64 as shown in FIG. 13 and others. Corresponding connectors 70a and 70b (shown in FIGS. 14A and 14B, respectively) interface between the two engines of the module 64 and the various other systems. Two such connector assemblies 70a, 70b are required in the example of FIG. 19, as two engines are provided in the dual turbojet module 64. Each connector assembly shown in FIG. 19, i.e., connector 1 and connector 2, actually comprises the engine module connector component 70a and its mating component 70b in the fuselage 10.

The on-board fuel supply can comprise any combination of internal wing tanks 1018, internal fuselage tanks 1020, and/or external wing or fuselage tanks 1022. One or more of these tanks 1018 through 1022 is fluidly connected to the engine module, e.g., engine module 64, through the connector assembly or assemblies (for the dual turbojet module) 70a, 70b. The fuel system further interfaces with the electrical system 1000 and sensors 1004.

FIG. 20 provides a more detailed schematic of the fuel system of the modular aircraft in its various embodiments, including provision for airborne refueling of other aircraft. The fuel supply comprises the internal wing tanks 1018, internal fuselage tank(s) 1020, and external tank(s) 1022 noted in FIG. 19. Each of the various tanks 1018 through 1022 displays its fuel quantity by means of a gauge, or more accurately in the case of an unmanned aircraft, a sensor 1024 to provide quantity information to a remote operator. Fuel is supplied from the selected tank(s) by pumps 1026 and distributed by means of the various valves 1028 in the system, as controlled by the electrical system 1000 of FIG. 19. Any external wing tanks 1022 connect to their respective internal wing tanks 1018, rather than connecting directly to a central delivery point. A crossfeed valve 1030 is provided between the two wing tanks 1018 to balance the fuel delivery from the internal and external fuel supplies on the two sides of the aircraft. Fuel flows through a fuel filter 1032 and heater 1034 to a fuel distribution valve 1036, and thence to the engine module as described further above. In the example of FIG. 20, two engine connector assemblies 70a, 70b are shown, indicating that this configuration would be for the dual turbojet engine module 64, as described further above in the schematic of FIG. 19.

The modular aircraft is equipped with single point refueling, via a single inlet or receptor 1038. Fuel flows during the refueling process from the inlet or receptor 1038 through a refueling valve 1040 by means of a refueling pump 1042, and then through a refueling filter 1044 to the right main or internal fuel tank 1018. Fuel is then distributed through the system by means of the various valves 1028 and the crossfeed valve 1030, as appropriate.

The modular aircraft can include a system for the airborne refueling of other aircraft, as well. The fuel distribution valve 1036 can simultaneously provide fuel to an output or delivery valve 1046 and output or delivery pump 1048 to a fuel output or delivery hose 1050. (A rigid refueling boom can be provided in lieu of the flexible hose 1050, if desired.) The sensors present at the end of the fuel connector allow for the precise alignment of the connector with the fuel nozzle of the tanker aircraft. Once connection is established, a transmitter-sensor 1052 senses the amount and rate of fuel flow through the hose 1050 and provides this information to the electrical system 1000 (FIG. 19) of the modular aircraft for processing. When the refueling is completed, the fuel hose is retracted into the fuselage. Retraction is automated by the FMS. Fuel can thus be delivered while airborne from the on-board fuel supply 1018 through 1022 of the modular aircraft to another aircraft 1052 in flight.

The operations of the modular aircraft can be considered as the most flexible operation covering a wide range at minimal costs, both in operations and training. With the interchangeability of all components, the same fuselage can be used for many operations and this allows reduced costs in maintenance and ownership. Minimum parts inclusive of engine units need to be maintained for different missions. The cost of training crews for multiple missions is greatly reduced, as one modular aircraft system is sufficient to cover multiple mission types. A single pilot or operator can perform multiple mission roles with minimal training due to the autonomous nature of the aircraft, and such operators require minimal cross training for operating the system.

It is to be understood that the present invention is not limited to the embodiments described above, but encompasses any and all embodiments within the scope of the following claims.

I claim:

1. A modular aircraft system, comprising:
    a fuselage having an empennage and rearwardly disposed first and second engine module stations, the empennage being permanently affixed to the fuselage;
    a plurality of mutually interchangeable wing modules, each of the wing modules being adapted for detachable connection to the fuselage, each of the wing modules comprising a left wing and a right wing, the wing modules having identical wing root configurations to one another and different spans and aspect ratios from one another;
    a plurality of mutually interchangeable engine modules, each engine module being different from another engine module and being adapted for detachable connection to engine module stations of the fuselage;
    an on-board fuel supply;
    a fuel delivery line deployed from the fuselage; and
    a fuel delivery system and wherein the fuel delivery line and the fuel delivery system are adapted for airborne delivery of fuel from the on-board fuel supply to another aircraft.

2. The modular aircraft system according to claim 1, wherein the modular aircraft is an unmanned aerial vehicle, and the fuselage comprises a selectively deployable aerodynamic brake disposed thereon, the aerodynamic brake being in front of the engine module stations.

3. The modular aircraft system according to claim 1, wherein:
    the fuselage comprises left and right wing root attachment stations, the wing root attachment stations being in mirror image to one another;
    each of the wing root attachment stations includes at least one of mechanical fittings electromagnetic fittings, electrical fittings, hydraulic fittings, and fuel supply fittings;
    the left wing and the right wing of each of the wing modules includes wing root configurations in mirror image to one another, each of the wing root configurations being adapted for removable attachment to a corresponding one of the wing root attachment stations of the fuselage;
    each of the wing root configurations includes at least one of mechanical fittings, electromagnetic fittings, electrical fittings, hydraulic fittings, and fuel supply fittings;
    the engine module stations of the fuselage includes at least one of mechanical fittings, electromagnetic fittings, electrical fittings, hydraulic fittings, and fuel supply fittings; and
    each of the engine modules includes an attachment base, each attachment base includes at least one of mechanical fittings, electromagnetic fittings, electrical fittings, hydraulic fittings, and fuel supply fittings, each of the engine modules being adapted for removable attachment to the engine module stations of the fuselage.

4. The modular aircraft system according to claim 1, wherein the empennage includes a fixed stabilizer and movable elevators, the stabilizer having left and right outboard tips, each of the tips having fixed upward and downward fins extending therefrom, each of the upward fins having a movable rudder.

5. The modular aircraft system according to claim 1, wherein the plurality of engine modules include a first engine module, a second engine module, and a third engine module, the first engine module being a single turboprop, the second engine module being a single turbojet, and the third engine module being dual turbojets.

6. The modular aircraft system according to claim 1, further comprising at least one payload bay disposed within the fuselage.

7. The modular aircraft system according to claim 1,
    wherein the fuel supply comprising at least one of an internal fuselage tank, an internal wing tank, and an external wing tank.

8. An unmanned aerial vehicle system, comprising:
    a fuselage, the fuselage having an empennage permanently affixed thereto;
    wherein the empennage includes a fixed stabilizer and movable elevators, the stabilizer having left and right outboard tips, each of the tips having fixed upward and downward fins extending therefrom, each of the upward fins having a movable rudder;
    a plurality of mutually interchangeable engine modules, each of the engine modules being adapted for individual installation upon the fuselage, the engine modules comprising a first engine module, a second engine module, and a third engine module, the first engine module including a single turboprop, the second engine module including a single turbojet, and the third engine module including dual turbojets;
    rearwardly disposed first and second engine module stations on the fuselage; and
    a plurality of mutually interchangeable engine modules, each engine module being different from another engine module and being adapted for detachable connection to engine module stations of the fuselage;
    a plurality of mutually interchangeable wing modules, each of the wing modules being adapted for detachable connection to the fuselage, each of the wing modules comprising a left wing and a right wing, the wing modules having identical wing root configurations to one another and different spans and aspect ratios from one another;
    a selectively deployable aerodynamic brake disposed atop the fuselage and in front of the engine module;
    an on-board fuel supply;

a fuel delivery line deployed from the fuselage; and a fuel delivery system, the fuel delivery line and the fuel delivery system being adapted for the airborne delivery of fuel from the on-board fuel supply to another aircraft; and at least one payload bay disposed within the fuselage.

9. The unmanned aerial vehicle system according to claim 8, further comprising:

left and right wing root attachment stations on the fuselage, the left and right wing root attachment stations being in mirror image to one another, each wing root attachment station of the fuselage including at least one of mechanical fittings, electromagnetic fittings, electrical fittings, hydraulic fittings, and fuel supply fittings; and wing root configurations on the left wing and the right wing of each of the wing modules, the wing root configurations of the left wing and the right wing of each of the wing modules being in mirror image to one another, each of the wing root configurations being adapted for attachment to a corresponding one of the wing root attachment stations of the fuselage, each of the wing root configurations including at least one of mechanical fittings, electromagnetic fittings, electrical fittings, hydraulic fittings, and fuel supply fittings;

rearwardly disposed first and second engine module stations on the fuselage, the engine module stations including at least one of mechanical fittings, electromagnetic fittings, electrical fittings, hydraulic fittings, and fuel supply fittings; and a plurality of engine modules, each of the engine modules having an attachment base, each attachment base including at least one of a plurality of mechanical fittings, electromagnetic fittings, electrical fittings, hydraulic fittings, and fuel supply fittings adapted for removable attachment to the engine module stations of the fuselage.

10. A modular aircraft system, comprising:

a fuselage having an empennage permanently affixed thereto and left and right wing root attachment stations, the wing root attachment stations being in mirror image to one another, each wing root attachment station of the fuselage including at least one of mechanical fittings, electromagnetic fittings, electrical fittings, hydraulic fittings, and fuel supply fittings;

wherein the empennage includes a fixed stabilizer and movable elevators, the stabilizer having left and right outboard tips, each of the tips having fixed upward and downward fins extending therefrom, and each of the upward fins having a movable rudder;

a plurality of wing modules, each of the wing modules including a left wing and a right wing, the left wing and the right wing of each of the wing modules having mirror image wing root configurations to one another, each of the wing root configurations being adapted for selective detachable connection to a corresponding one of the wing root attachment stations of the fuselage, and each of the wing root configurations including at least one of mechanical fittings, electromagnetic fittings, electrical fittings, hydraulic fittings, and fuel supply fittings;

the fuselage further having rearwardly disposed first and second engine module stations, the engine module stations including at least one of mechanical fittings, electromagnetic fittings, electrical fittings, hydraulic fittings, and fuel supply fittings;

a plurality of engine modules, the engine modules and the engine module stations of the fuselage being adapted for detachable connection to the engine module stations of the fuselage, each of the engine modules having an attachment base, each attachment base including at least one of mechanical fittings, electromagnetic fittings, electrical fittings, hydraulic fittings, and fuel supply fittings;

an on-board fuel supply, the fuel supply including at least one of internal fuselage tanks, internal wing tanks, and external wing tanks;

a fuel delivery line deployed from the fuselage; and a fuel delivery system, the fuel delivery line and the fuel delivery system being adapted for airborne delivery of fuel from the on-board fuel supply to another aircraft.

11. The modular aircraft system according to claim 10, wherein:

the wing modules have identical wing root configurations to one another and different spans and aspect ratios from one another; and each engine module is different.

12. The modular aircraft system according to claim 10, wherein:

the modular aircraft is an unmanned aerial vehicle; and the fuselage includes one payload bay and a selectively deployable aerodynamic brake, the aerodynamic brake being on the fuselage and in front of the engine module stations.

13. The modular aircraft system according to claim 10, wherein the engine modules comprise a single turboprop, a single turbojet and dual turbojets.

* * * * *